(12) United States Patent
Forrest

(10) Patent No.: US 7,533,761 B2
(45) Date of Patent: May 19, 2009

(54) TREE STAND

(76) Inventor: Lewis Forrest, R.R. #2, Amprior, Ontario (CA) K7S 3G8

( * ) Notice: Subject to any disclaimer, the term of this patent is extended or adjusted under 35 U.S.C. 154(b) by 22 days.

(21) Appl. No.: 11/399,478

(22) Filed: Apr. 7, 2006

(65) Prior Publication Data

US 2007/0235261 A1 Oct. 11, 2007

(51) Int. Cl.
A63B 27/00 (2006.01)
(52) U.S. Cl. .................. 182/136; 182/133; 182/134; 182/135; 182/187
(58) Field of Classification Search .............. 182/133, 182/134, 135, 136, 187
See application file for complete search history.

(56) References Cited

U.S. PATENT DOCUMENTS

| 4,458,782 | A | * | 7/1984 | Meyer | 182/187 |
| 4,909,353 | A | * | 3/1990 | Govin et al. | 182/187 |
| 4,997,063 | A | * | 3/1991 | Bradley | 182/187 |
| 5,090,505 | A | * | 2/1992 | Amacker | 182/187 |
| 5,363,941 | A | * | 11/1994 | Richard | 182/187 |
| 6,085,868 | A | * | 7/2000 | Anthony et al. | 182/187 |
| 6,595,325 | B2 | * | 7/2003 | Ulrich | 182/136 |
| 6,722,472 | B2 | * | 4/2004 | Berkbuegler | 182/187 |

OTHER PUBLICATIONS

"Dictionary.com"; http://dictionary.reference.com/; pp. 1-4.*

* cited by examiner

*Primary Examiner*—Alvin C Chin-Shue
*Assistant Examiner*—Colleen M Quinn
(74) *Attorney, Agent, or Firm*—George A. Seaby

(57) ABSTRACT

A tree stand includes a planar load supporting platform having an inner end for abutting a tree trunk, a pair of two-section arms pivotally connected to sides of the platform for rotation between positions against such platform sides and erect positions in which they define armrests, a belt having a pair of ends slidable in said arms for forming a loop around a tree trunk to hold the stand on the tree, and a latch on the arms for locking the belt in the arms.

6 Claims, 6 Drawing Sheets

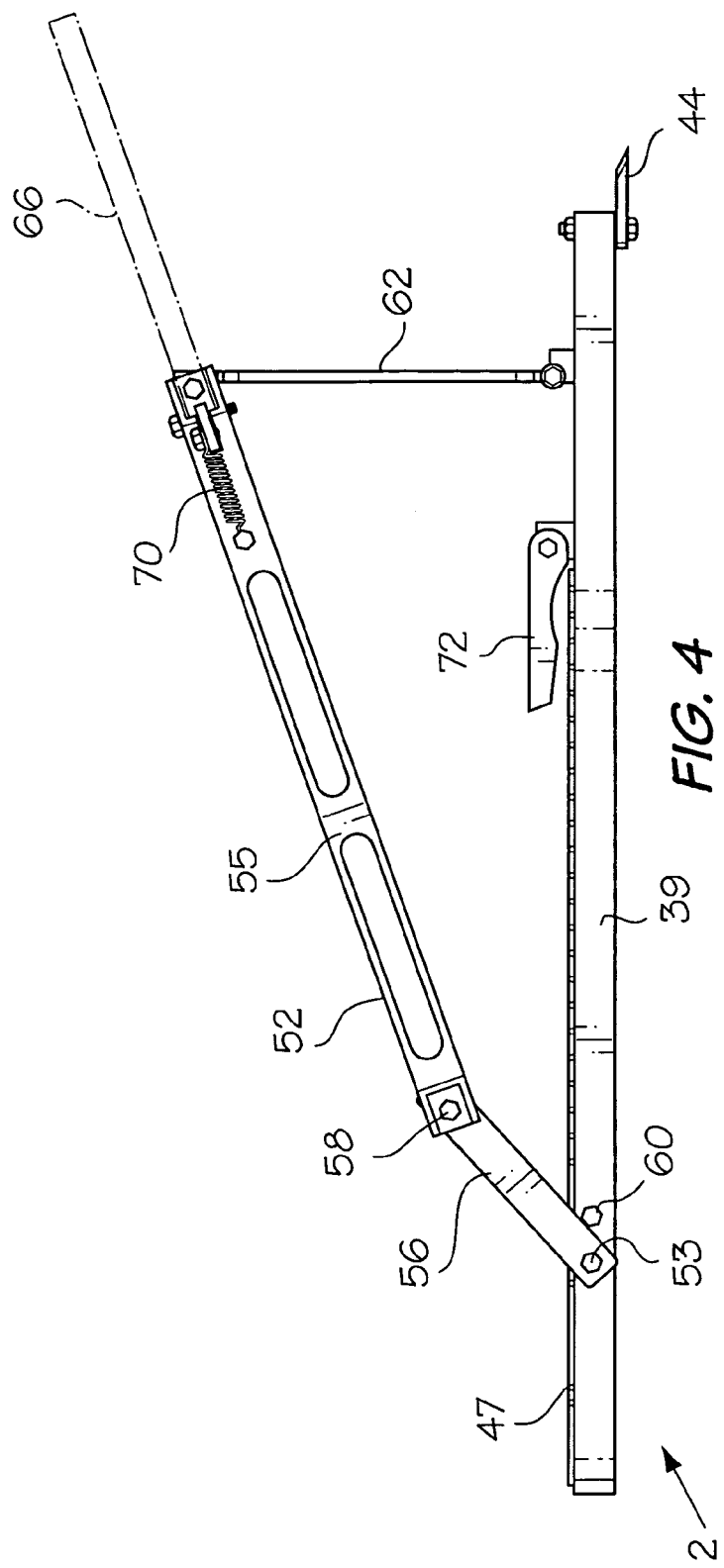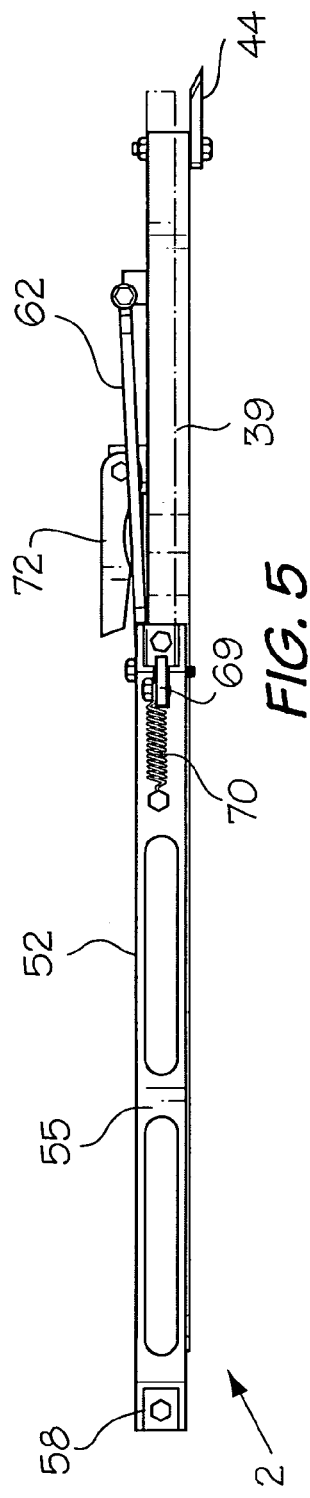

TREE STAND

BACKGROUND OF THE INVENTION

1. Field of the Invention

This invention relates to a tree stand.

2. Discussion of the Prior Art

Tree stands are usually two-piece apparatuses used primarily by hunters for climbing a tree and for supporting the hunters at elevated positions on the trunk of trees. As described in the inventors U.S. Pat. No. 6,588,546, issued Jul. 8, 2003 (which is incorporated herein by reference) and as is apparent from the list of references on the cover page of the patent, there is a large volume of patent literature relating to tree stands.

As also described in U.S. Pat. No. 6,588,546, in general existing tree stands are somewhat complicated, bulky and not readily stackable. Moreover, most tree stands do not include proper arm rests. It will be appreciated that sitting on a tree stand for a lengthy period without any arm support can be uncomfortable. Those stands that do include arm rests tend to be bulky.

GENERAL DESCRIPTION OF THE INVENTION

An object of the present invention is to provide a relatively simple, collapsible tree stand, the elements of which are easy to erect and collapse and are flat in the collapsed condition.

Another object of the invention is to provide a compact tree stand, which includes arm rests which can be stored flat in the non-use or transport position and easily rotated to and locked in an erect use position.

Accordingly, the invention relates to a tree stand comprising a planar load supporting platform having a pair of sides, an inner end for abutting a tree trunk and an outer free end; a support arm pivotally connected to each side of said platform, each said arm including a first arm section having one end pivotally connected to a platform side proximate said outer end and a second arm section pivotally connected at one end to a second end of said first arm section, said platform side and said first and second arm sections occupying separate parallel planes, whereby said arm sections can be folded into overlapping relationship against the platform side; a belt having a pair of ends slidable in second, free ends of said second arm sections for forming a loop around a tree; and latches on said second arm sections for releasably locking the belt in said second arm sections.

BRIEF DESCRIPTION OF THE DRAWINGS

The invention is described hereinafter in greater detail with reference to the accompanying drawings, which illustrate preferred embodiments of the invention, and wherein:

FIG. 4 is a side view of the lower platform of FIG. 3 in the erect condition;

FIG. 5 is a side view of the lower platform of FIG. 3 in the collapsed condition;

It will be noticed that parts have been omitted from some figures of the drawings. This was done to make it easier to see the various elements of the invention.

DESCRIPTION OF THE PREFERRED EMBODIMENT

Figure 1:
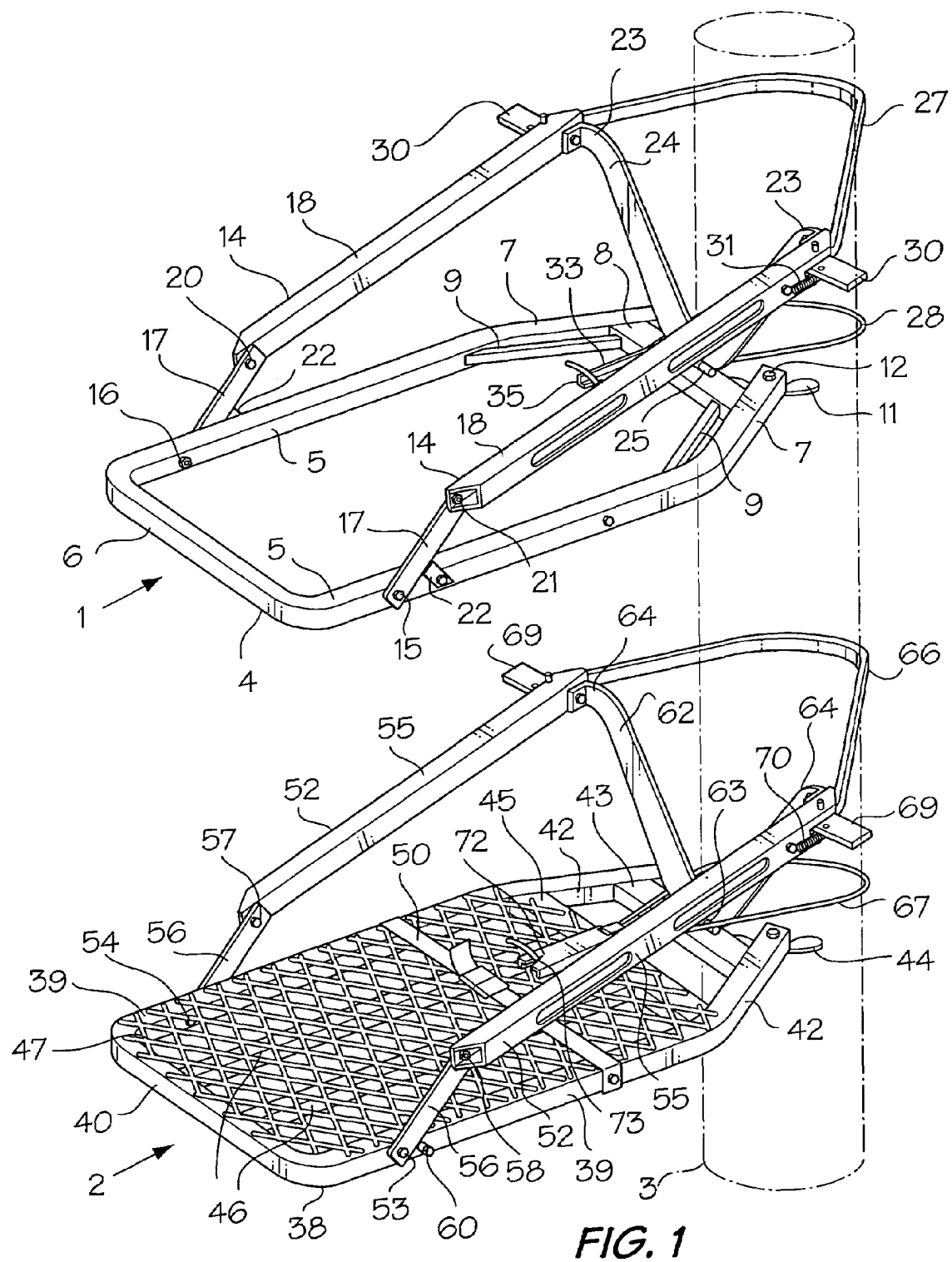
FIG. 1 is an isometric view of a tree stand in accordance with the invention in the erect, use condition.

Referring to FIG. 1, a preferred embodiment of the tree stand includes upper and lower platforms indicated generally at 1 and 2, respectively. The platforms 1 and 2 are used to climb a tree 3 and, once the desired location in the tree has been reached, the platforms are securely connected to the tree for use as a seat (platform 1) and a footrest (platform 2).

Figure 2:
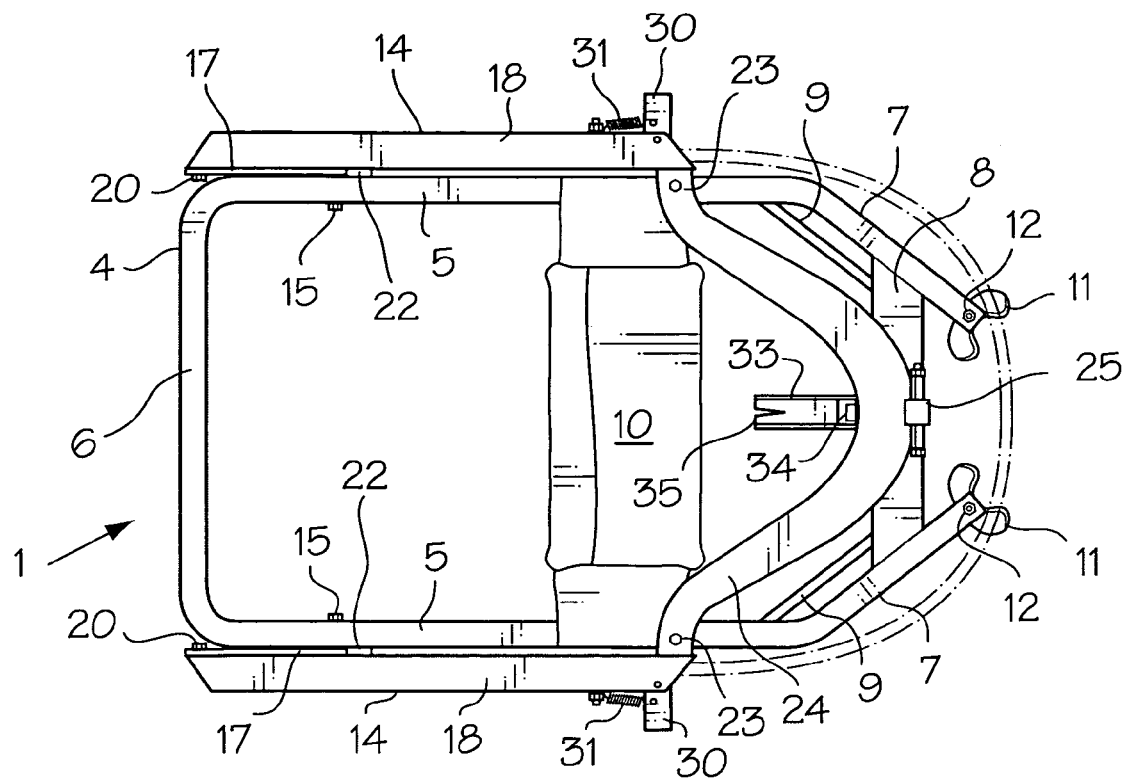
FIG. 2 is a top view of an upper platform used in the tree stand of FIG. 1 in the closed or collapsed condition.

As best shown in FIGS. 1 and 2, the upper platform 1 is defined by a generally rectangular frame 4, which includes straight sides 5 and one straight, outer end 6. A pair of converging arms 7 interconnected by a crossbar 8 define the other, inner end of the frame 4. Reinforcing bars 9 extend between the inner ends of the sides 5 and the crossbar 8. A fabric seat 10, which is shown in the folded condition in FIG. 2, is slidably mounted on the sides of the frame. When climbing a tree, the seat 10 is located near the outer end of the frame 4 and the user sits on the seat facing the tree 3. When the platform 1 is at the desired location on the tree 3, the seat 10 is slid to a position close to the tree and the user sits with his/her back to the tree. Wing-shaped teeth 11 are pivotally mounted on the free ends of the arms 7 by bolts 12 and nuts (not shown). The pivotable teeth 11 make the platform readily adaptable to trees of different shapes and diameters. The two teeth 11 can be at different angles to the free ends of the arms 7. When the platform 1 is on a small diameter tree trunk, the sharp edges of the teeth 11 rotate towards each other and, on a large diameter tree, the teeth rotate in the opposite direction.

A pair of support arms 14 are pivotally connected to the sides 5 near the straight end 6 by bolts 15 and nuts 16. Each arm 14 is formed of two sections, namely an outer section 17 and an inner section 18 ("outer" and "inner") being used to denote the proximity to a tree trunk when the platform is in the use position). The outer section 17 is a short, flat strip of metal, which is pivotally connected to the tubular inner section 18 using a bolt 20 and a nut 21. When the arms 14 are being moved to the open or erect condition of the platform 1 (which is shown in FIG. 1) movement of the outer arm sections 17 is limited by an inclined stop 22. The ends 23 of a generally V-shaped end wall or yoke 24 are pivotally connected to the inner ends of the arms 14. The center of the yoke 24 is pivotally connected to the crossbar 8 by a hinge 25 so that the yoke and the arms 14 can be pivoted between the erect, use position of the platform shown in FIG. 1 and collapsed position (FIG. 2) for transport or storage of the stand. Because the sections 17 and 18 of the arms 14 are outside of the sides 5 of the frame 4 in the collapsed condition of the platform 1, the arms lie in the same plane as the sides 5 and the outer ends 23 of the yoke 24 are sandwiched between the frame sides 5 and the arms 14. The result is a flat platform, which when one inch tubes are used to form the sides 5 and the arm sections 18, is not much more than one inch thick.

The platform 1 is retained in a fixed position on a tree trunk 3 by a belt 27, which can be a length of conventional V-belt, and by a cord 28. The free ends of the belt 27 are inserted into the open free ends of the arms 14. Such free ends of the belt 27 are retained in the arm sections 18 by latches of the type described in the inventor's U.S. Pat. No. 6,588,546. Each latch includes a lever 30 pivotally mounted in a slot in the inner end of the tubular arm section 18 and a helical spring 31 connected at one end to the lever 30 and at the other end to the arm 14. The spring 31 biases the lever 30 into engagement with the belt 27. Teeth (not shown) on the inner end of the lever 30 engage the belt 27 to lock it in one position. When the lever 30 is manually rotated towards the exposed belt loop, the belt is released and can be pulled out of or inserted into the arm 14 to lengthen or shorten the loop around the tree trunk 3.

Once the platform 1 or 2 is in the desired position on a trunk 3, the cord 28 is used to secure the platform in a horizontal position. A cord tensioner of the type described in U.S. Pat. No. 6,588,546 is used for such purpose. The tensioner is a lever 33 pivotally connected to a block 34 (FIG. 2) on the crossbar 8. One end of the cord 28 is permanently connected to the crossbar 8, and the other end under passes under the crossbar 8, around the trunk 3, under the crossbar 8 again, over one side of the lever 33 and through a V-shaped notch 35 in the outer, free end of the lever. When the lever 33 is rotated upwardly from the horizontal position shown in FIGS. 1 and 2 to the vertical position (not shown) the cord 28 is tensioned to securely anchor the platform 1 to the trunk 3. In order to unlock the tensioner, it is merely necessary to pull the free end of the cord 28 out of the notch 35 which causes the lever 33 to rotate to the release position.

The lower platform 2 is similar in structure to the upper platform 1. Like the upper platform 1, the lever platform 2 includes a rectangular frame 38 defined by straight sides 39, a straight outer end 40 and converging arms 42 at the inner ends of the sides 39 connected by a crossbar 43. Wing-shaped teeth 44 are pivotally mounted on the inner ends of the arms 42 for engaging the tree 3. A second crossbar 45 and bars 46 extending longitudinally between the outer end 40 and the crossbar 45 support a metal mesh floor 47. The extra bars and the mesh floor 47 are required, because the lower platform 2 supports a stand user in the standing position when climbing a tree. A strap 50 for holding the platforms 1 and 2 together and for holding a user's feet on the floor 46 during climbing extends between the sides 39 of the lower platform 2. During tree climbing, the user sits on the upper platform and tilts and lifts the lower platform 2 using his/her feet and the strap 50, and then stands on the lower platform 2 and uses his/her hands to move the upper platform 1 to a higher position on the tree. Of course, the procedure is reversed when descending the tree.

A pair of arms 52 are pivotally connected to the sides 39 near the straight, outer end 40 by bolts 53 (one shown) and nuts 54 (one shown). Each arm 52 includes a tubular inner section 55, and an outer section 56 defined by a short metal strip. The outer section 56 is pivotally connected to the inner section 55 by a bolt 57 and a nut 58. When the arms 52 are moved to the erect positions (FIG. 1) movement is limited by stops 60 (one shown).

Figure 3:
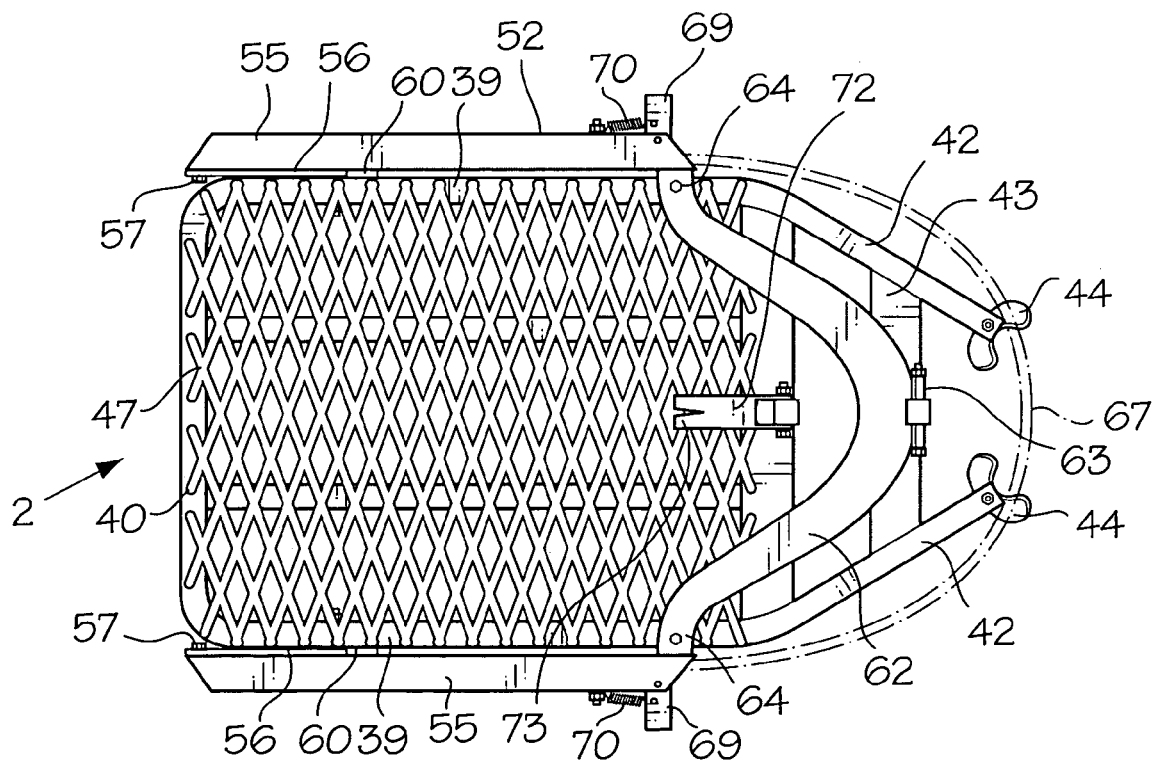
FIG. 3 is a top view of a lower platform used in the tree stand of FIG. 1 in the collapsed condition.
Figure 6:
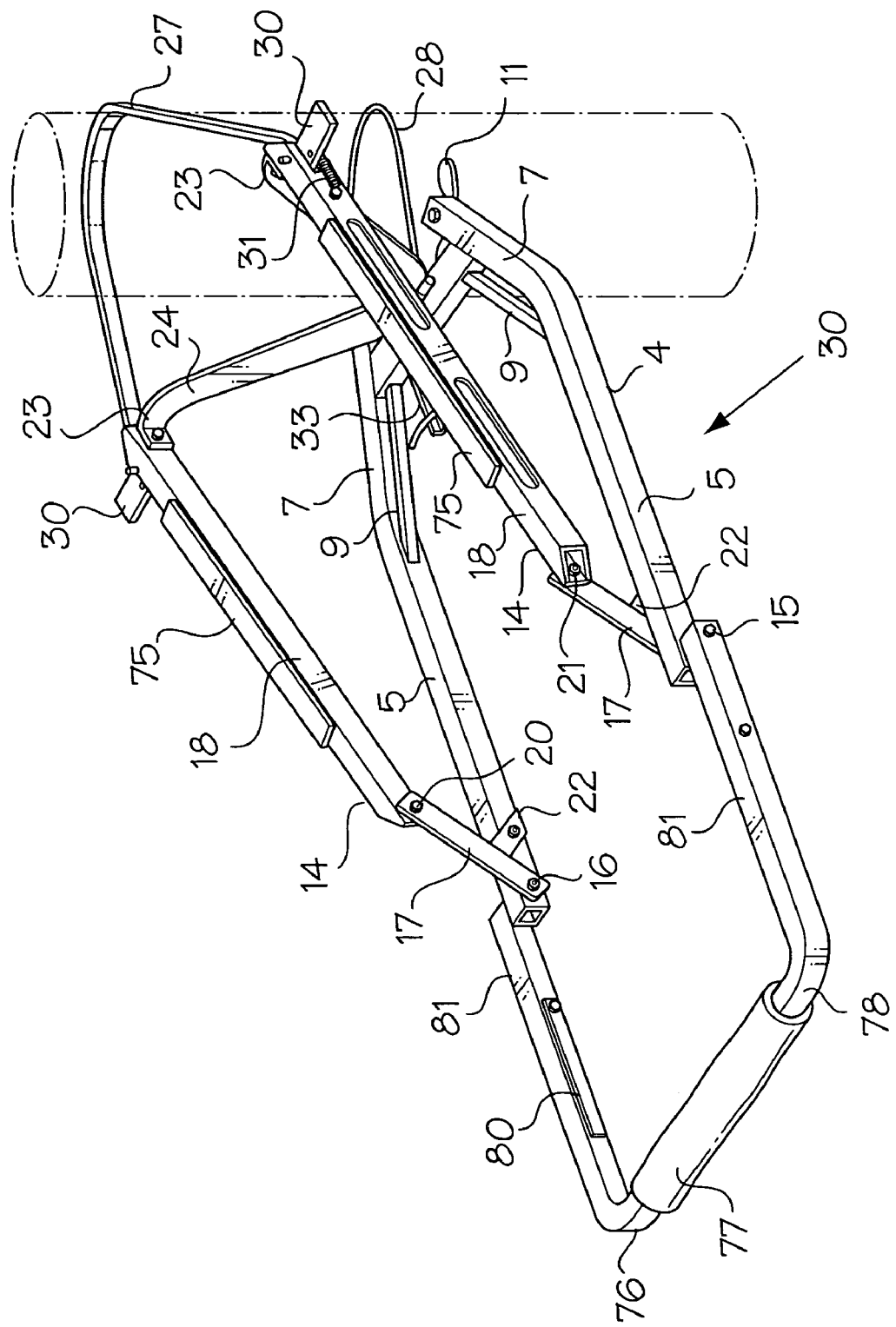
FIG. 6 is an isometric view of second embodiment of the upper platform in the erect condition.
Figure 7:
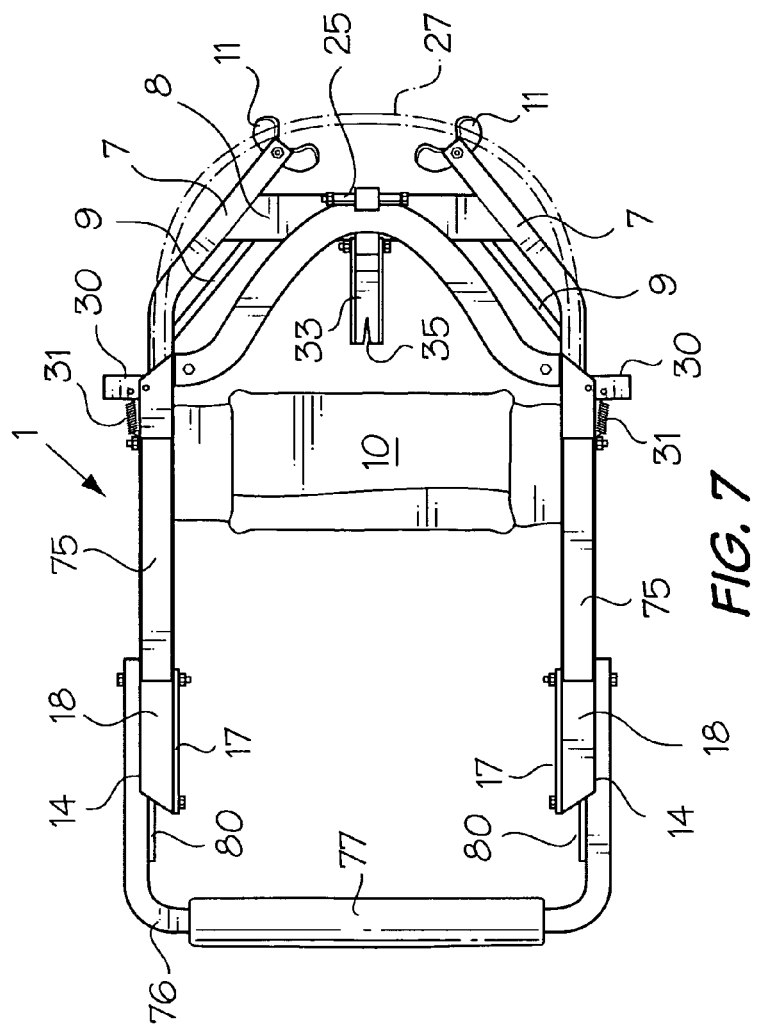
FIG. 7 is a top view of the upper platform of FIG. 6 in the collapsed condition.
Figure 8:
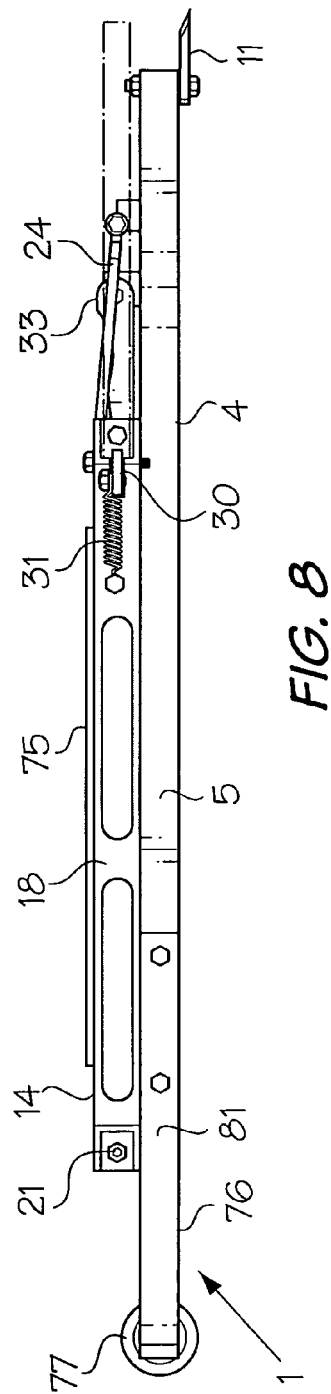
FIG. 8 is a side view of the platform of FIGS. 6 and 7 in the collapsed condition.
Figure 9:
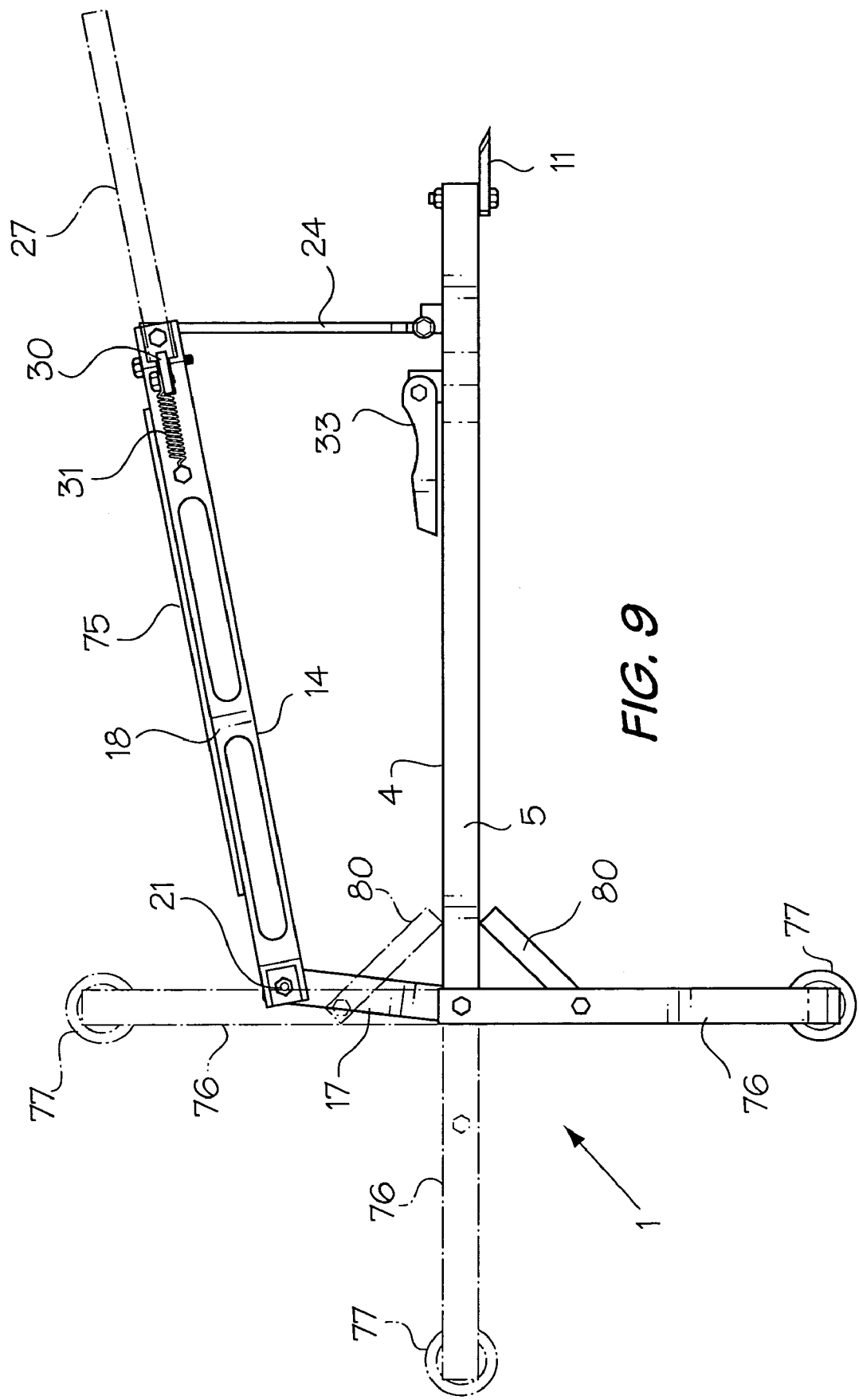
FIG. 9 is a side view of the platform of FIGS. 6 to 8 in the erect condition.

The center of a generally V-shaped yoke 62 is pivotally connected to the crossbar 43 by a hinge 63 for rotation of the yoke between a collapsed position (FIG. 3) and an erect position (FIG. 1). The L-shaped ends 64 of the yoke 62 are pivotally connected to the inner ends of the arms 52.

The platform 2 is retained in a fixed position on a tree 3 by a belt 66 and a cord 67. Latches, similar to the latches on the upper platform, including levers 69 and springs 70, are used to secure the ends of the belt 66 in the tubular inner sections 58 of the arms 52, and the cord 67 is tensioned around the tree using a tensioning lever 72 similar to the lever 33 on the upper platform 1. The lever 72 is pivotally mounted on the crossbar 45 and includes a notch 73 in the outer, free end thereof. In the case of the lower platform 2, the lever 72 opens downwardly, i.e. has a generally inverted U-shaped cross section which is the reverse of the lever 33 on the upper platform 1. In the non-use position, the lever 72 is vertically oriented. In use, the cord 67 extends over the crossbar 43, around the tree 3, again over the crossbar, beneath one side of the lever 72 and through the notch 73 in the free end of the lever. In the rest position, the lever 72 extends outwardly at an acute angle from the crossbar 45. In order to tension the cord 28, the user steps on the lever 72, rotating it downwardly to the horizontal cord tensioning position shown in FIG. 1.

Referring to FIGS. 6 to 9, a second embodiment of the upper platform 1 is similar to the first embodiment of the upper platform, except that the arms 14 are mounted inside of the frame 4 and soft pads 75 are provided on the inner sections 18 of the arms 14. In addition, the frame includes a generally C-shaped (when viewed from above) outer end or extension 76, which is pivotally connected to the sides 5 of the frame by the bolts 15 and the nuts 16 used to connect the arms 14 to the frame sides 5. The extension 76 includes a cylindrical pad 77 on the outer end 78 thereof. The extension 76 can be rotated from the horizontal position (FIGS. 6 and 7) upwardly or downwardly. In the upper position, the pad 77, can be used as an arm or gun rest. In the lower position, the extension 76 defines a footrest, and by being down out of the way, gives a hunter or photographer a clear view of the area in front of him/her. Moreover, in the lower position, the extension 76 can be used as a seat when climbing a tree 3; in which case, the seat 10 remains in the ultimate use position near the inner, tree end of the platform 1. When the platform 1 is in the use position, the user merely turns around and sits on the seat 10. Stops 80 on the sides 81 of the extension 76 are used to prevent rotation of the extension beyond positions perpendicular to the remainder of the frame 4.

While the tree stand has been described as including a pair of platforms 1 and 2, in fact, each platform constitutes a tree stand. In the appended claims, the tree stand is defined as a single platform.

The invention claimed is:

1. A tree stand comprising a planar load supporting platform having a pair of sides, an inner end for abutting a tree truck and an outer free end; a support arm pivotally connected to each side of said platform, each said arm including a first arm section and a second arm section connected end-to-end with said first arm section, said first arm section having one end pivotally connected to a platform near said outer free end and closer to said outer free end than to the inner end of the platform, said second arm section being pivotally connected at one end to a second end of said first arm section, said platform side and said first and second arm sections occupying parallel planes, a flat, V-shaped yoke having a center pivotally connected to the inner end of the platform at the center thereof and a pair of ends pivotally connected to second ends of said second arm sections; whereby said first and second arm sections can be folded into overlapping relationship with each other against the platform side and the yoke can be folded downwardly and forwardly into overlapping relationship with the inner end of the platform; a belt having a pair of ends slidable in second, free ends of said second arm sections for forming a loop around a tree; and latches on said second arm sections for releasably locking the belt in said second arm sections.

2. The tree stand of claim 1, wherein said first arm sections are pivotally connected to exterior surfaces of said platform sides, whereby, the arms occupy the same plane as the platform in the folded position.

3. The tree stand of claim 1 including a seat extending between the platform sides.

4. The tree stand of claim 3 including a first stop on each side of said platform for limiting rotation of said arms with respect to said platform sides.

5. The tree stand of claim 4 including an extension pivotally connected to said platform sides for rotation between an upper position for use as an arm or gun rest and a lower position for use as a climbing seat or a footrest.

6. The tree stand of claim 5 including a second stop for retaining the extension in the upper or lower position.

* * * * *